United States Patent
Melamed

(10) Patent No.: US 11,158,028 B1
(45) Date of Patent: Oct. 26, 2021

(54) MIRRORED SELFIE

(71) Applicant: Snap Inc., Santa Monica, CA (US)

(72) Inventor: Guy Melamed, Haifa (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/665,811

(22) Filed: Oct. 28, 2019

(51) Int. Cl.
| | | |
|---|---|---|
| *G06T 3/00* | (2006.01) |
| *G06T 3/60* | (2006.01) |
| *G06T 11/60* | (2006.01) |
| *G06F 3/0484* | (2013.01) |
| *G06F 3/0482* | (2013.01) |

(52) U.S. Cl.
CPC .............. *G06T 3/60* (2013.01); *G06F 3/0482* (2013.01); *G06F 3/04845* (2013.01); *G06T 11/60* (2013.01)

(58) Field of Classification Search
None
See application file for complete search history.

(56) References Cited

U.S. PATENT DOCUMENTS

| | | | | | |
|---|---|---|---|---|---|
| 5,606,344 | A * | 2/1997 | Biaskey | ................... | G09B 5/00 345/169 |
| 6,804,414 | B1 * | 10/2004 | Sakai | ................... | G06K 9/3208 358/488 |
| 9,716,842 | B1 * | 7/2017 | Worley | ................... | G09G 5/377 |
| 2004/0021792 | A1 * | 2/2004 | Yasui | ..................... | H04N 7/142 348/373 |
| 2005/0094015 | A1 * | 5/2005 | Kuruma | ............. | H04N 5/23245 348/333.01 |
| 2005/0157174 | A1 * | 7/2005 | Kitamura | ............... | H04N 7/142 348/207.99 |
| 2010/0164684 | A1 * | 7/2010 | Sasa | ....................... | H04N 5/232 340/5.83 |
| 2011/0099501 | A1 * | 4/2011 | Mull | .................... | G06F 3/04845 715/771 |
| 2011/0164042 | A1 * | 7/2011 | Chaudhri | ............ | G06F 3/04845 345/473 |
| 2011/0249079 | A1 * | 10/2011 | Santamaria | ......... | H04L 65/1089 348/14.02 |
| 2011/0283236 | A1 * | 11/2011 | Beaumier | ............. | G06F 3/0482 715/835 |
| 2014/0218459 | A1 * | 8/2014 | Wenlong | ............ | H04N 21/8146 348/14.01 |
| 2015/0070586 | A1 * | 3/2015 | McCoy | ................. | H04N 13/337 348/588 |
| 2015/0123991 | A1 * | 5/2015 | Yarosh | ................. | G02B 27/017 345/629 |
| 2015/0135115 | A1 * | 5/2015 | Feng | .................... | G06F 3/04845 715/771 |

(Continued)

*Primary Examiner* — Martin Mushambo
(74) *Attorney, Agent, or Firm* — Schwegman Lundberg & Woessner, P.A.

(57) ABSTRACT

Systems and methods are provided for performing operations including: receiving, by a messaging application, an image captured by a front-facing camera of a computing device of a first user; displaying, by the messaging application, the image on a display screen of the computing device; receiving a request to send the image to a computing device of a second user; in response to receiving the request, generating a mirrored version of the image that was captured by the front-facing camera; and sending the mirrored version of the image to the second user.

20 Claims, 10 Drawing Sheets

(56) References Cited

U.S. PATENT DOCUMENTS

| | | | |
|---|---|---|---|
| 2016/0026426 A1* | 1/2016 | Lee | G06F 3/1454 345/156 |
| 2016/0077401 A1* | 3/2016 | Lamberger | G02B 5/0808 359/263 |
| 2016/0078280 A1* | 3/2016 | Tai | G06T 13/80 382/118 |
| 2016/0080934 A1* | 3/2016 | Yu | H04W 4/60 455/418 |
| 2016/0188959 A1* | 6/2016 | Matsunaga | G06K 9/00234 382/162 |
| 2016/0202857 A1* | 7/2016 | Rivera | G06F 3/0483 715/716 |
| 2016/0286131 A1* | 9/2016 | Zhu | H04N 5/2621 |
| 2017/0054945 A1* | 2/2017 | Li | H04N 21/44008 |
| 2017/0169570 A1* | 6/2017 | Vashishtha | G06K 9/4633 |
| 2017/0257543 A1* | 9/2017 | Rowles | H04N 7/18 |
| 2017/0285345 A1* | 10/2017 | Ferens | G06F 1/163 |
| 2017/0365101 A1* | 12/2017 | Samec | A61B 3/09 |
| 2018/0001198 A1* | 1/2018 | Frappiea | A63F 13/49 |
| 2018/0131878 A1* | 5/2018 | Charlton | H04N 5/232945 |
| 2018/0255237 A1* | 9/2018 | Salem | G06T 7/74 |
| 2018/0268595 A1* | 9/2018 | Sama | G06T 13/80 |
| 2018/0352150 A1* | 12/2018 | Purwar | H04N 5/23293 |
| 2019/0007619 A1* | 1/2019 | Lei | H04N 5/247 |
| 2019/0007620 A1* | 1/2019 | Lei | H04M 1/0264 |
| 2019/0082118 A1* | 3/2019 | Wang | H04N 5/23229 |
| 2019/0096112 A1* | 3/2019 | Pao | G06T 17/00 |
| 2019/0132642 A1* | 5/2019 | Wang | G06T 11/203 |
| 2019/0355172 A1* | 11/2019 | Dsouza | G06T 17/00 |
| 2019/0370550 A1* | 12/2019 | Chen | G06T 19/006 |

\* cited by examiner

MIRRORED SELFIE

TECHNICAL FIELD

The present disclosure relates generally to providing graphical elements using a messaging application.

BACKGROUND

Modern day user devices include front-facing cameras to allow users to capture images of themselves (selfies). Such cameras present images of the users in a mirrored manner to make the displayed images seem more natural to the person in front of the camera. This means that if a user holds up their right hand and captures an image with the front-facing camera, the image will show the hand raised on the right side of the image. In this way, the front-facing camera shows the user their image as if the user were looking at themselves in the mirror.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
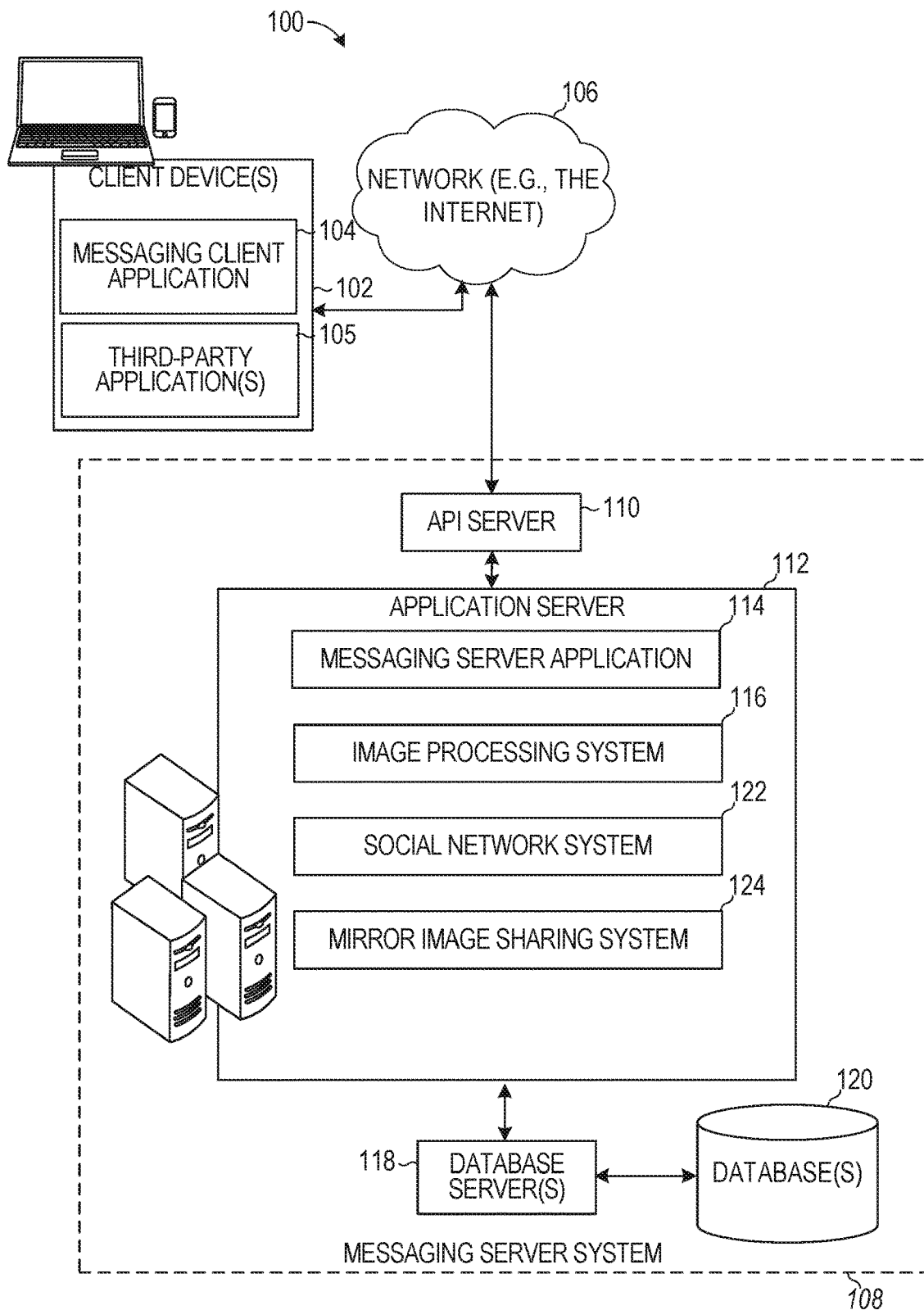
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical user devices allow users to capture images of themselves using a front-facing camera. Once captured, the front-facing camera programmatically mirrors content of image so that the image presented to the first user on a screen looks mirrored. Namely, the image, captured by the front-facing camera, presented to the first user appears to the first user as if the first user were looking at themselves in a mirror. In such systems, when the first user would like to share the image captured by the front-facing camera with a second user, the second user will also see the image that depicts content in a mirror manner. Such presentation appears unnatural to the second user. For example, the first user may be wearing a shirt with text written on it and mirroring the image results in the text being presented in an unreadable manner (e.g., the text is incorrectly oriented). When such an image is then shared with the second user, the second user is unable to read the text correctly as the text was mirrored.

In such typical systems, in order to flip the image (e.g., to undo any mirroring effects), the first user needs to save the image and apply various third-party editing tools, which may not be secure or trustworthy, to modify the image to undo the mirroring effect. In some cases, applying such editing tools may not even be possible when a user augments a given image that has mirroring effects with graphical elements. Even still, after modifying the image, the user has to access various additional screens of a messaging application to retrieve the modified image and share the modified image with the second user. This requires navigating through multiple pages of information until the modified image is created and shared and can be very tedious and time consuming. Given the complexity and amount of time it takes to modify images captured by front-facing cameras to undo any mirroring effects, users become discouraged from making such modifications and end up sharing the images with unreadable content. This results in users losing interest in content that is shared which wastes resources.

The disclosed embodiments improve the efficiency of using the electronic device by providing a messaging application that intelligently and automatically reverses or flips an image captured by a front-facing camera before sending the image to others. This results in users receiving images that were captured by a front-facing camera that look more natural and have correct meaning. In this way, each user that views the image sees an image in the way the user expects. Namely, a first user who is capturing the image using the front-facing camera sees the image of themselves in a mirrored manner (as if the first user were looking at a mirror which is more natural to the first user) and a second user who receives the image sees the image of the first user in a non-mirrored manner (as if the second user were looking at the first user which is more natural to the second user).

Specifically, according to the disclosed embodiments, a messaging application receives an image captured by a front-facing camera of a user device and displays the image on a display screen of the user device. The messaging application receives a user request to send the image to a second user and, in response, generates a non-mirrored version of the image that was captured by the front-facing camera. The messaging application then sends the non-mirrored version of the image to the second user.

In some cases, the generation of the non-mirrored image (or mirroring back of the mirrored image) may be conditioned or based on whether one or more graphical elements were added to the image after the image was captured. Namely, if the image was augmented with one or more graphical elements, the image may not be mirrored back prior to sending to another user to avoid making the graphical elements unreadable or look unrealistic. In some cases, the image augmented with the graphical elements may only be mirrored back or flipped (to create a non-mirrored version of the image) automatically before being sent to another user if the graphical elements do not include textual content.

In this way, the disclosed embodiments improve the efficiency of using the electronic device by reducing the number of screens and interfaces a user has to navigate through to modify an image captured by a front-facing camera to reverse or undo any mirroring effects before sharing the image with other users. This is done by automatically detecting that an image being shared was captured by a front-facing camera and automatically mirroring back the image (generating a non-mirrored version of the image) in response to a request to send the image to another user. This enhances security and reliability of using the device as a user need not access third-party tools to manually make such modifications before sharing content with other users. This also reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a mirror image sharing system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. In an embodiment, the third-party application 105 can be accessed by the client device 102 to perform various activities and interactions, such as listening to music, videos, track exercises, view graphical elements (e.g., stickers), communicate with other users, and so forth.

As an example, the third-party application 105 can be a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The messaging client application 104 allows a user to access a camera feature. The camera feature of the messaging client application 104 activates a front-facing camera of the client device 102 and presents video or images captured or received by the front-facing camera on a display screen of the client device 102 as the video or images are being captured. In an implementation, the front-facing camera is integrated or placed on a same side of the client device 102 as the screen that presents the content captured by the front-facing camera. The front-facing camera programmatically flips or mirrors the images captured by the camera before such images are presented to the user on the screen. In this way, the user sees a mirror image of themselves when they are capturing images using the front-facing camera. Namely, the images of the user appear to the user as if the user were looking at themselves in front of a mirror.

In an embodiment, the client device 102 also includes a rear-facing camera placed on an opposite side as the front-facing camera of the client device 102. The messaging client application 104 presents content captured by the rear-facing camera on the screen that is on the side of the front-facing camera as the rear-facing camera is capturing content. In some implementations, the rear-facing camera does not programmatically flip or mirror the content captured by the rear-facing camera while the front-facing camera does programmatically flip or mirror the content it captures.

After the user presses a suitable button of the messaging client application 104 to store the image or video captured by the front-facing camera, the messaging client application 104 allows the user to review or edit the images that were captured. In some cases, one or more editing tools may be presented to modify or edit the stored images. Such editing tools may include a mirror option, which when selected by the user, flips, and inverts or mirrors the image being shown to the user. Namely, the user can see the image captured by the front-facing camera in a mirrored manner (as if the user were looking in a mirror) and when the user selects the mirror option, the image is flipped or mirrored (so that content in the original image is no longer mirrored) so the user sees the same image as if the user were not looking through the mirror but appears the same way as someone else looking at the user. The user can toggle presentation of the image in a mirrored and non-mirrored manner by selecting the mirror option.

The user continues to see the images in a mirror manner as if the user were looking at a mirror while the user edits or reviews the images. The messaging client application 104 may receive a user request to transmit, share or send the images captured by the front-facing camera and that were stored to one or more other users. In response to receiving this request, the messaging client application 104 flips, inverts, or mirrors back the image that was stored (so that content in the image no longer appears to be mirrored) before sending the image to the one or more other users. This way, when the one or more other users receive the images, they look more natural to the recipient users. Namely, the users who receive the images see the content (in a non-mirrored manner) as if those users were looking at the user who appears in the image rather than seeing a mirror image of the person.

In some embodiments, the user can augment the mirrored or non-mirrored images using one or more graphical elements (e.g., adding stickers, text, images, avatars, emojis, virtual objects, or other content). In such cases, the messaging client application 104 may intelligently or automatically determine whether or not to flip, invert, or mirror the image that has been augmented with graphical elements (so that the image content no longer appears mirrored) before sharing the image with one or more other users. For example, the messaging client application 104 may retrieve metadata associated with the one or more graphical elements. The metadata may indicate whether a given graphical element that has been added is mirror enabled or allowed. If each graphical element that has been added is mirror enabled or allowed, then the messaging client application 104 automatically mirrors the image including all of the added graphical elements (e.g., causes the content in the image to no longer appear mirrored) before sending the image augmented with the graphical elements to one or more other users. If each graphical element that has been added is not mirror enabled or not mirror allowed, then the messaging client application 104 does not automatically mirror the image including all of the added graphical elements (keeps all the image content appearing as mirrored) before sending the image augmented with the graphical elements to one or more other users. Namely, in this case, the messaging client application 104 shares the image augmented with the one or more graphical elements in a mirrored manner (e.g., the content in the image remains mirrored so the recipient users see content in the image as if the recipient users were looking at the content through a mirror).

In some cases, the messaging client application 104 never flips or mirrors back content that has been augmented with graphical elements before sending the content to one or more other users. In some cases, the messaging client application 104 never flips or mirrors back content that has been augmented with textual content before sending the content to one or more other users.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., graphical elements, images or video) from a messaging client application 104 to a messaging server application 114, and for possible access by another messaging client application 104 or third-party application 105; a graphical element list; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the mirror image sharing system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the mirror image sharing system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The mirror image sharing system 124 presents an image captured by a front-facing camera to a first user. The image presented to the first user may be mirrored such that the first user sees the content of the image as if the first user were looking at a mirror. For example, if the front-facing camera captures an image of an object that includes textual content, the image is mirrored and presented to the first user in a mirrored manner. In this case, the first user sees the textual content included in the object in an incorrect orientation making the text unreadable. The mirror image sharing system 124 receives a user request to share the image with one or more other users. In response to receiving this request, the mirror image sharing system 124 generates a mirrored version of the image in which the content in the image is mirrored (e.g., the mirrored version depicts content of the image in a non-mirrored manner). In this case, the textual content that was originally mirrored (and in the incorrect orientation) is converted to non-mirrored textual content before being sent to the other users so that the text is in the correct orientation when viewed by the other users. So, while the mirror image sharing system 124 presents content to the first users that was captured by the front-facing camera in a mirrored manner, the mirror image sharing system 124 automatically mirrors back the content so that a recipient users of the content does not see the content in a mirrored manner but sees the same content as non-mirrored.

In some instances, the mirror image sharing system 124 intelligently determines whether or not to mirror the image (prior to sharing the image with the other users) based on one or more graphical elements added to the image by the first user. In some cases, when one or more graphical elements are added to the image, the mirror image sharing system 124 does not mirror back the image before sending to the other users. In some cases, only when the graphical elements include textual content, the mirror image sharing system 124 does not mirror back the image before sending to the other users. In some cases, when the image does not include any added graphical elements, the mirror image sharing system 124 always mirrors back the image before sending to the other users.

The application server 112 is communicatively coupled to a database server 118, which facilitates access to a database 120, in which is stored data associated with messages processed by the messaging server application 114. Database 120 may be a third-party database. For example, the application server 112 may be associated with a first entity, and the database 120 or a portion of the database 120 may be associated and hosted by a second different entity. In some implementations, database 120 stores user data that the first entity collects about various each of the users of a service provided by the first entity. For example, the user data includes user names, phone numbers, passwords, addresses, friends, activity information, preferences, videos or content consumed by the user, and so forth.

Figure 2:
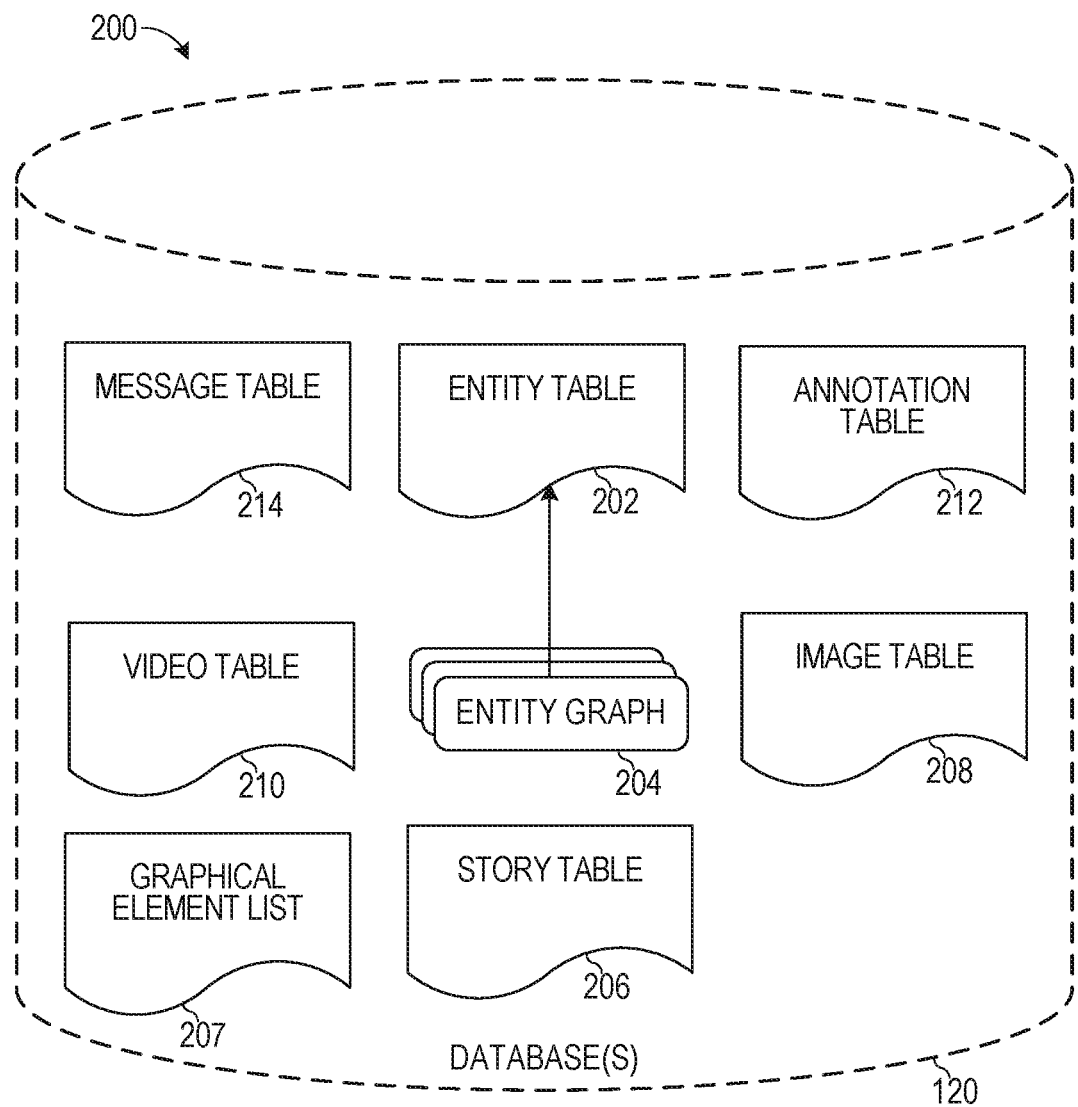
FIG. 2 is a schematic diagram illustrating data that may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data, which, in one embodiment, is associated with messages for which records, are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Graphical element list 207 stores graphical elements that a user can choose to add to an image or video to augment the image or video. The graphical element list 207 includes textual graphics, avatars, emojis, bitmojis, images, and videos. Each graphical element in the graphical element list 207 is associated with metadata that indicates whether the respective graphical element 207 can be mirrored, inverted, or flipped. For example, a textual graphical element in the graphical element list 207 may include metadata that indicates that the textual graphical element cannot be mirrored or is not allowed to be mirrored. As another example, a necklace graphical element in the graphical element list 207 may include metadata that indicates that the necklace can be mirrored or is allowed to be mirrored. The mirror image sharing system 124 may determine whether or not to mirror an image (captured by a front-facing camera) before sharing the image with other users based on the metadata associated with the graphical elements added to the image.

Application list 209 stores a list of all applications installed on a given client device 102. As new applications are installed on the given client device 102, the client device updates the application list 209 with the name and identity of the installed application. Application list 209 also stores a list of all the applications that are configured to share authentication information with the messaging client application 104 (e.g., applications that are connected with the messaging client application 104 and/or that can be selected to be connected with the messaging client application 104).

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
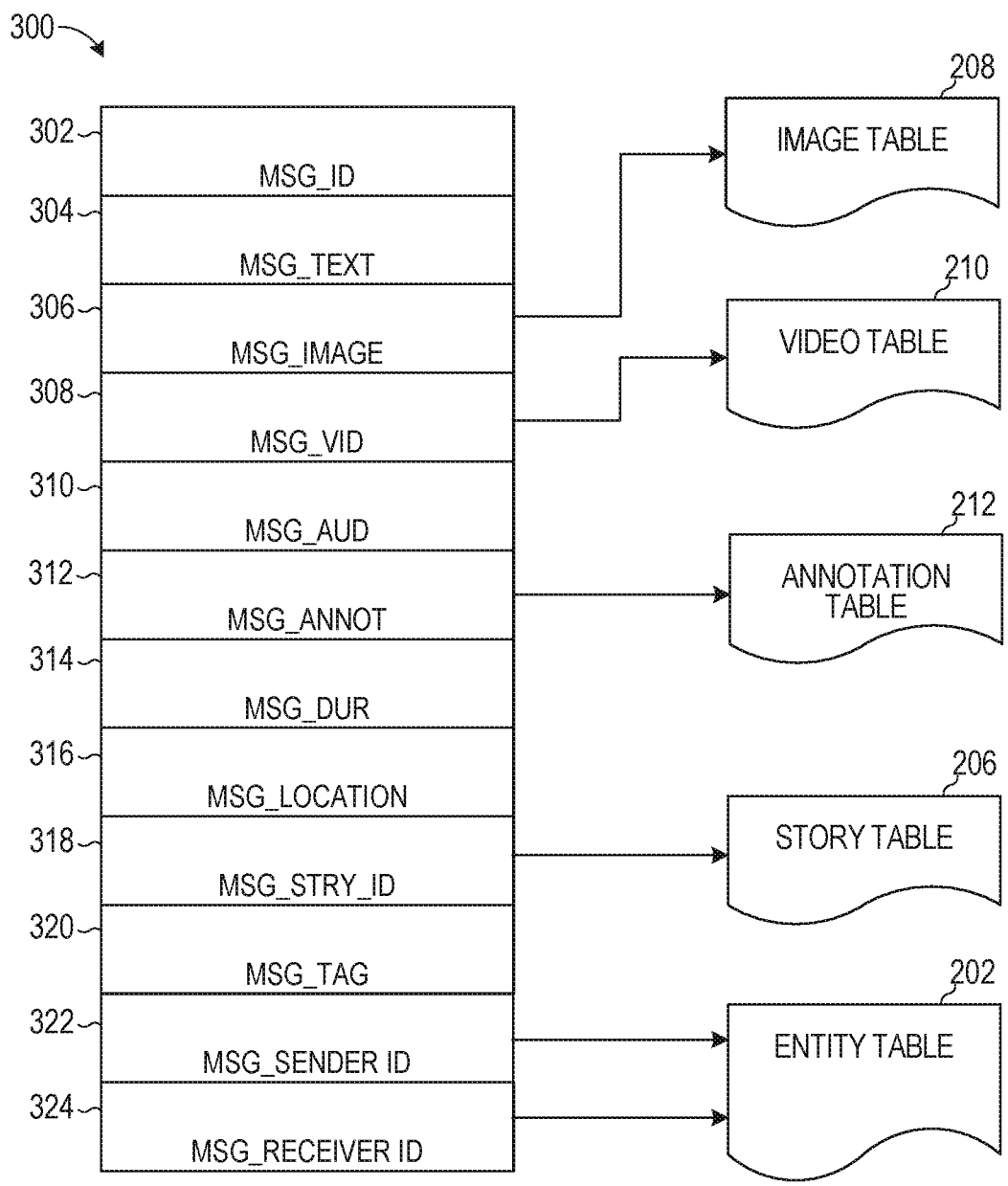
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data that is captured by a microphone or retrieved from the memory component of the client device 102 and is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
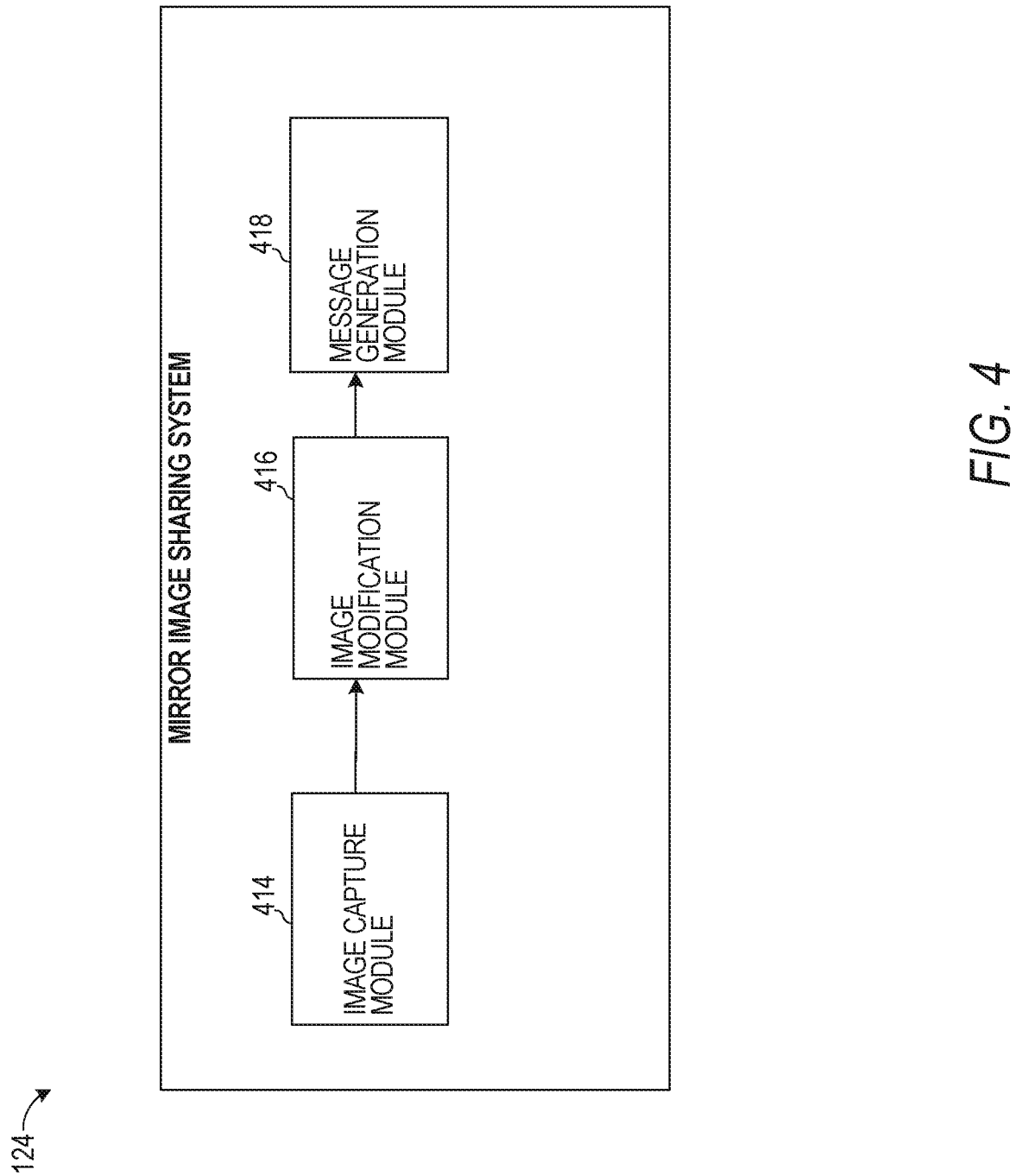
FIG. 4 is a block diagram showing an example mirror image sharing system, according to example embodiments.

FIG. 4 is a block diagram showing an example mirror image sharing system 124, according to example embodiments. The mirror image sharing system 124 includes an image capture module 414, an image modification module 416, and a message generation module 418.

The user launches an image capture component of the messaging client application 104. In response, the image capture module 414 presents on a display screen of the client device 102 an image or video captured by a front-facing camera of the client device 102. The image or video presented to the user on the display screen of the client device 102 may be mirrored relative to the viewpoint of the front-facing camera of the client device 102. Namely, the front-facing camera programmatically captures an image of an object in front of the front-facing camera (e.g., a user's face) and mirrors the image before it is presented to the user on the display screen of the client device 102.

In some cases, the image capture module 414 allows a user to switch to the rear-camera of the client device 102. In response to the user selecting an option to access the rear-camera, the image capture module 414 activates the rear-camera of the client device 102 and presents an image or video being captured by the rear-camera. In an implementation, the image or video presented to the user that is captured by the rear-camera may not be mirrored relative to the view of the rear-camera. For example, the user may initially begin capturing or storing a video using the rear-camera of the client device 102 in which the content is not mirrored and then select an option to resume capturing and storing the video using the front-facing camera in which the content is mirrored. As a result, a first portion of the video is captured in a way that the content in the first portion is not programmatically mirrored and a second portion of the video is captured in a way that the content in the second portion is programmatically mirrored.

The image modification module 416 presents one or more editing tools to the user while the image or video is being presented to the user on the screen of the client device 102. The editing tools allow the user to select one or more graphical elements (e.g., avatars, text, emojis, images, videos, and so forth) to add or augment the image or video being presented to the user. For example, the user can add text to the image or video presented on the display screen at a user-selected position. As another example, the user can add a virtual object, such as a necklace, at a user-selected position to the image or video presented on the display screen. As another example, a user can select a mirror option among the editing tools to mirror back the image or video being presented on the display screen. In some embodiments, in response to receiving the user selection of the mirror option, the entire image being presented is mirrored. The user can further augment the now mirrored image with one or more graphical elements before sharing the image with one or more other users.

In some embodiments, the image modification module 416 presents a video in which a first portion was captured using the rear-facing camera and a second portion was captured using the front-facing camera. In such cases, when the user selects the mirror option, the image modification module 416 may mirror back only the portion of the video that was captured by the front-facing camera and not mirror back any portion of the video captured by the rear facing camera. For example, the image modification module 416 may access frame information for each frame in the video and determine whether the frame information indicates that the frame was captured using the front or rear-facing camera. In response to determining that a given frame in the video was captured using the front-facing camera, the image modification module 416 automatically mirrors that frame and replaces the frame in the video with the mirrored version of the frame. In response to determining that a given frame in the video was captured using the rear-facing camera, the image modification module 416 may not mirrors that frame and continues on to processing subsequent frames.

The message generation module 418 allows a user to send an image that has been captured by the image capture module 414 and optionally modified by the image modification module 416 to one or more other users. The message generation module 418 determines whether an image or video being shared with the other users was captured using a front-facing camera. In response to determining that the image or video being shared was captured using the front-facing camera, the message generation module 418 automatically generates a mirrored version of the image or portion of the video (captured by the front-facing camera) before sending the image to the designated recipients. In some cases, the message generation module 418 receives the image or video in which the image or video portion that includes the content captured by the front-facing camera has been mirrored already by the image modification module 416. In such cases, the message generation module 418 simply sends the already mirrored version to the designated recipients without mirroring the content again.

In some embodiments, the message generation module 418 determines whether or not to generate the mirrored version of the image based on whether one or more graphical elements were added to the image or video by the image modification module 416. In some cases, the message generation module 418 never generates the mirrored version of the image when one or more graphical elements were added to the image that was captured by the front-facing camera. In some cases, the message generation module 418 generates the mirrored version of the image when the one or more graphical elements that have been added are associated with metadata that indicates that mirroring is allowed for each added graphical element. For example, if two graphical elements are added to the image but only one is associated with metadata that indicates that mirroring is allowed but not the other, then the message generation module 418 does not generate the mirrored version of the image.

In some embodiments, the message generation module 418 may determine that a given image has been mirrored by the image modification module 416 before being augmented with one or more graphical elements. For example, a user may have viewed an image captured by a front-facing camera and selected a mirroring option. In response, the image modification module 416 presents a mirrored version of the image. Then, the user may add one or more graphical elements to the mirrored version of the image (e.g., may add a textual object). The user may instruct the message generation module 418 to send the mirrored version of the image to which the graphical elements were added. The message generation module 418 may send the mirrored version of the image with the graphical elements to designated recipients without mirroring the image again because the mirrored version of the image was already generated. In such cases, when the user augments an image with one or more graphical elements after mirroring the image captured by the front-facing camera, the message generation module 418 does not generate a mirrored version of the image before sending to designated recipients.

For example, a user can capture an image using a front-facing camera and view the image on a screen in which content is presented in a mirrored manner (e.g., text is incorrectly oriented). The user can select a mirror option to mirror the image so that the content is presented in a non-mirrored manner (e.g., text is correctly oriented). Then the user can augment the image with one or more graphical elements that are associated with metadata indicating that mirroring is allowed and request that the image be shared with designated recipients. In response, the message generation module 418 may maintain the image in the non-mirrored manner augmented with the graphical elements and send the image to the designated recipients without mirroring the image again even though the graphical elements are allowed to be mirrored.

As another example, a user can capture an image using a front-facing camera and view the image on a screen in which content is presented in a mirrored manner (e.g., text is incorrectly oriented). The user can select a mirror option to mirror the image so that the content is presented in a non-mirrored manner (e.g., text is correctly oriented). Then the user requests that the image be shared with designated recipients. In response, the message generation module 418 may maintain the image in the non-mirrored manner and send the image to the designated recipients without mirroring the image again.

As another example, a user can capture an image using a front-facing camera and view the image on a screen in which content is presented in a mirrored manner (e.g., text is incorrectly oriented). Then the user requests that the image be shared with designated recipients. In response, the message generation module 418 may automatically mirror the image so that the content is presented in a non-mirrored manner (e.g., text is correctly oriented) and send the image to the designated recipients after mirroring the image.

Figure 5:
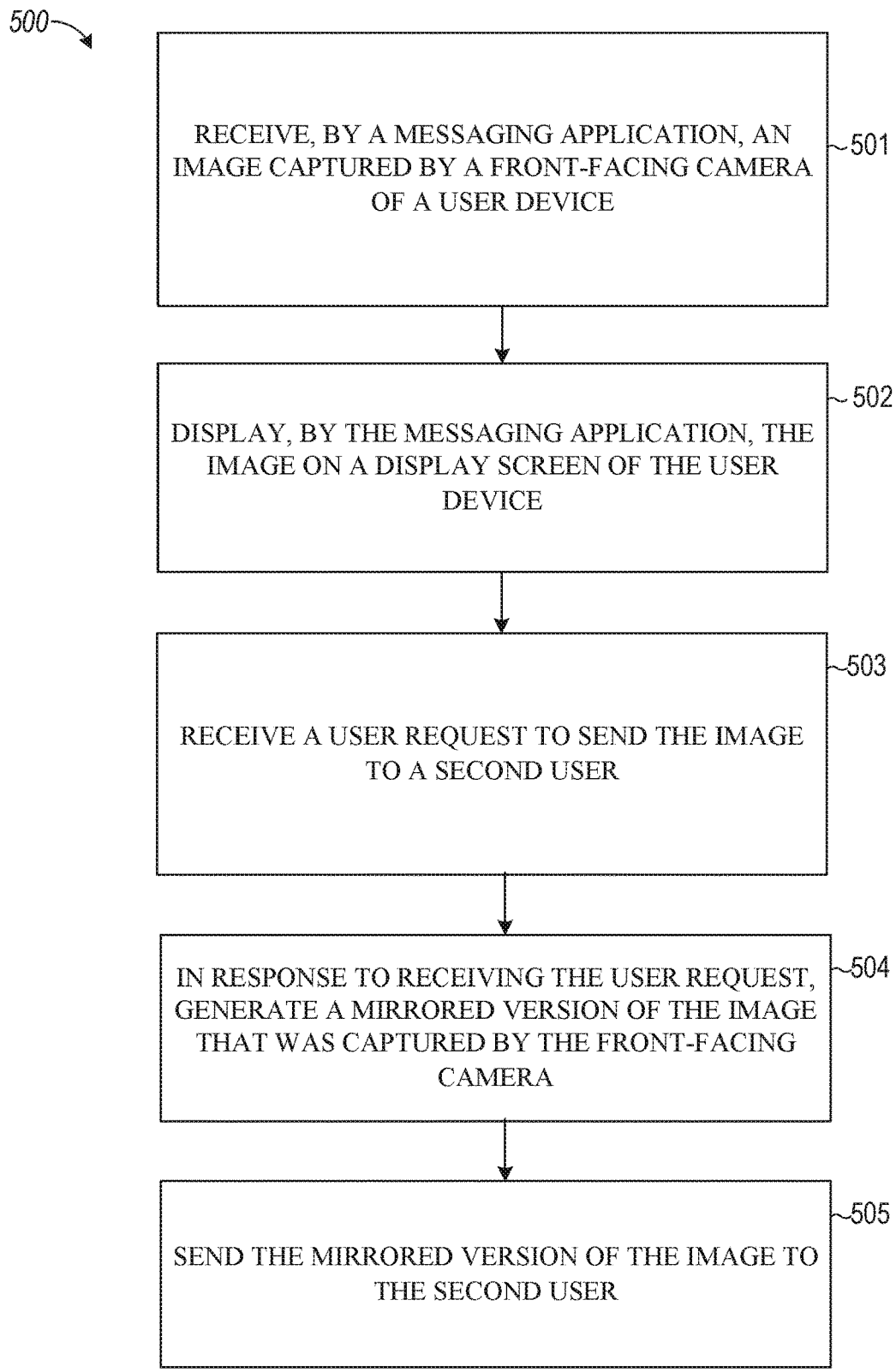
FIG. 5 is a flowchart illustrating example operations of the mirror image sharing system, according to example embodiments.

FIG. 5 is a flowchart illustrating example operations of the mirror image sharing system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the mirror image sharing system 124 receives, from a messaging application, an image captured by a front-facing camera of a user device.

At operation 502, the mirror image sharing system 124 displays, using the messaging application, the image on a display screen of the user device. For example, the messaging client application 104 presents an image in which text appears in an incorrect orientation because the image is programmatically mirrored by the front-facing camera (e.g., the orientation seen in a mirror).

At operation 503, the mirror image sharing system 124 receives a user request to send the image to a second user.

At operation 504, the mirror image sharing system 124 generates a mirrored version of the image that was captured by the front-facing camera in response to receiving the user request. For example, the messaging client application 104 mirrors back the image that was programmatically mirrored by the front-facing camera to present the text in a correct orientation (the orientation seen by a person looking directly at the text and not through a mirror).

At operation 505, the mirror image sharing system 124 sends the mirrored version of the image to the second user.

Figure 6:
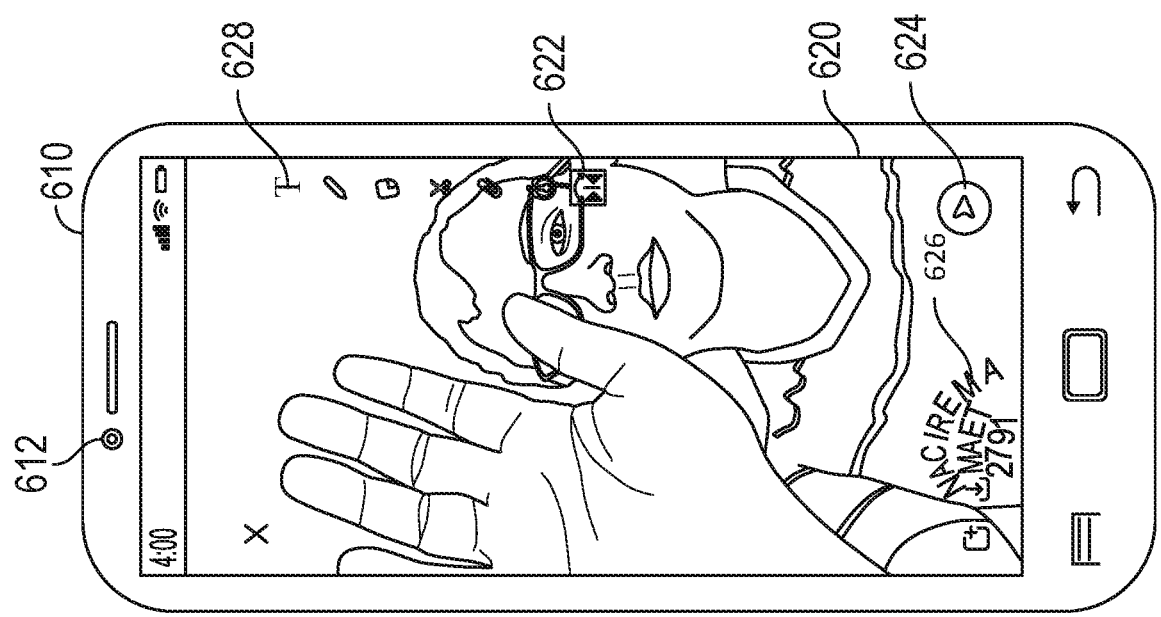
FIGS. 6-8 are illustrative inputs and outputs of the mirror image sharing system, according to example embodiments.
Figure 7:
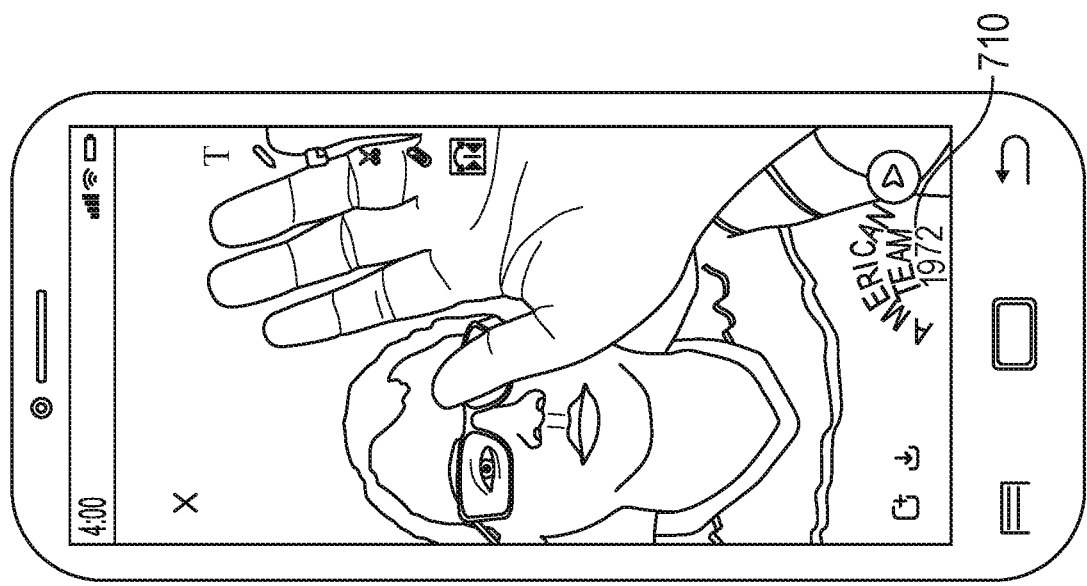
Figure 8:
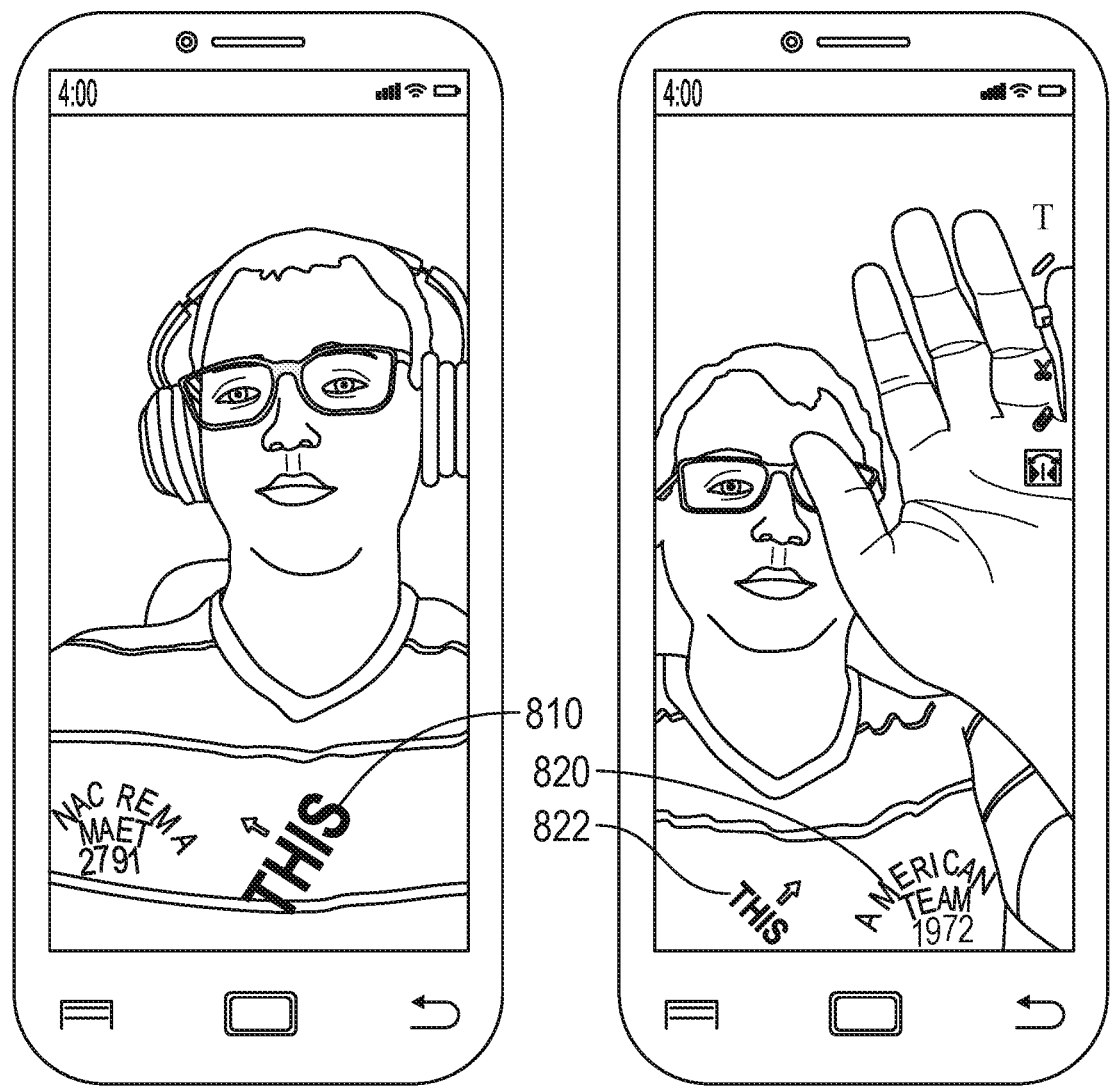

FIGS. 6-8 are illustrative inputs and outputs of the mirror image sharing system 124, according to example embodiments. For example, as shown in FIG. 6, an image 620 is presented on a display depicting content captured by a front-facing camera 612. The front-facing camera 612 is on a same side of the computing device 610 as the display screen. The image 620 that is presented to the user on the display screen has been mirrored before being presented. Namely, the content shown in image 620 is a mirror image of what is actually captured by the front-facing camera 612. As shown, the content captured by the front-facing camera 612 includes a text object 626. Because the front-facing camera 612 programmatically mirrors the content it captures and then presents a mirrored version of that content, the text object 626 is a mirrored version of what is captured by the front-facing camera 612. Namely, the text object 626 depicts text in an incorrect orientation because the text is mirrored. This makes it more natural for the user viewing themselves in the screen of the device 610.

In some embodiments, the mirror image sharing system 124 presents on the screen of the device 610 together with the image 620 a set of image editing tools. The image editing tools include a text object insertion tool 628 and a mirror option 622. In response to receiving a user selection of the mirror option 622, the mirror image sharing system 124 generates a mirrored version of the image displayed on the screen. Specifically, if the image displayed on the screen depicts mirrored content captured by the front-facing camera 612, then the selection of the mirror option 622 causes the mirror image sharing system 124 to mirror the image again and thereby create a non-mirrored version of the content. As an example, FIG. 7 shows the non-mirrored version of the image 620, which is presented after receiving a user selection of the mirror option 622. As shown in FIG. 7, the text object 626, which was in the incorrect orientation in FIG. 6, is now presented as text object 710 in FIG. 7 in the correct orientation because the text is no longer mirrored.

Referring back to FIG. 6, in some implementations, the mirror image sharing system 124 receives a user selection of the send option 624. In response to receiving the selection of the send option 624, the mirror image sharing system 124 automatically generates a non-mirrored version of the content shown on the display if the image 620 is determined to be mirrored. Namely, a recipient user specified by the user may receive a version of the image 620 that is presented to the user in non-mirrored form. For example, while a first user may see themselves in a mirrored image 620 (FIG. 6), the recipient user may see the same image 620 as the non-mirrored version of the image shown in FIG. 7. In some embodiments, the mirror image sharing system 124 intelligently determines whether or not to mirror the image 620 that is mirrored based on whether one or more graphical elements were added to the image 620. In some cases, if one or more graphical elements were added to the image 620, the mirror image sharing system 124 may prevent mirroring back the image (e.g., may not generate a non-mirrored version of the image) and may send to the recipient users the image in mirrored form augmented with the added one or more graphical elements. In some cases, certain graphical elements may be allowed to be mirrored (as indicated by their metadata) and in such instances, the mirror image sharing system 124 may mirror back the image (e.g., generate a non-mirrored version of the image) including the added graphical elements before sending the image to the designated recipients.

For example, the user may select the text object insertion tool 628, which allows the user to augment the image 620 with one or more textual graphical elements. In response to receiving the user selection of the text object insertion tool 628, the mirror image sharing system 124 receives text entry from the user and allows the user to place the text at a user selected portion of the image 620. As shown in FIG. 8, the user added the textual graphical element 810 to the mirrored version of the image that was displayed. After the user adds the textual graphical element 810 and selects one or more recipients to whom to send the augmented image, the mirror image sharing system 124 determines whether or not to flip or mirror back the image augmented with the textual graphical element 810 (e.g., generate a non-mirrored version of the image with the textual graphical element 810). In this case, the textual graphical element 810 may be associated with metadata that indicates mirroring is not allowed. As such, the mirror image sharing system 124 may prevent or avoid mirroring back (generating a non-mirrored version of the image) and may send to the designated recipient the image in mirrored form (e.g., with the text object 626 in the incorrect orientation) with the added textual graphical element 810.

In some cases, the user may select the mirror option 622 before adding the textual graphical element 810. For example, the user may add textual graphical element 822 to the image that has been mirrored (e.g., that depicts content in non-mirrored form). Namely, as shown in FIG. 8, the textual graphical element 822 is added to the non-mirrored image (e.g., with the text object 626 in the incorrect orientation 820) with the added textual graphical element 822. The mirror image sharing system 124 may send the image that has been augmented with the graphical elements after being mirrored back (e.g., the non-mirrored image augmented with the graphical elements) to a designated recipient without having to mirror the image beforehand.

As another example, the user may select a virtual object insertion tool (not shown) which allows the user to augment the image 620 with one or more virtual objects (e.g., a necklace). In response to receiving the user selection of the virtual object insertion tool, the mirror image sharing system 124 receives a user selection of a virtual object (e.g., from a list of virtual objects) and allows the user to place the virtual object at a user-selected portion of the image 620. For example, the user may add a necklace to a person depicted in the mirrored version of the image 620 that is displayed. After the user adds the virtual object and selects one or more recipients to whom to send the augmented image, the mirror image sharing system 124 determines whether or not to flip or mirror back the image augmented with the virtual object (e.g., generate a non-mirrored version of the image with the virtual object). In this case, the virtual object may be a necklace that is associated with metadata that indicates mirroring is allowed. As such, the mirror image sharing system 124 may mirror back (generate a non-mirrored version of the image together with the added virtual object) and may send to the designated recipient the image in non-mirrored form with the added virtual object.

Figure 9:
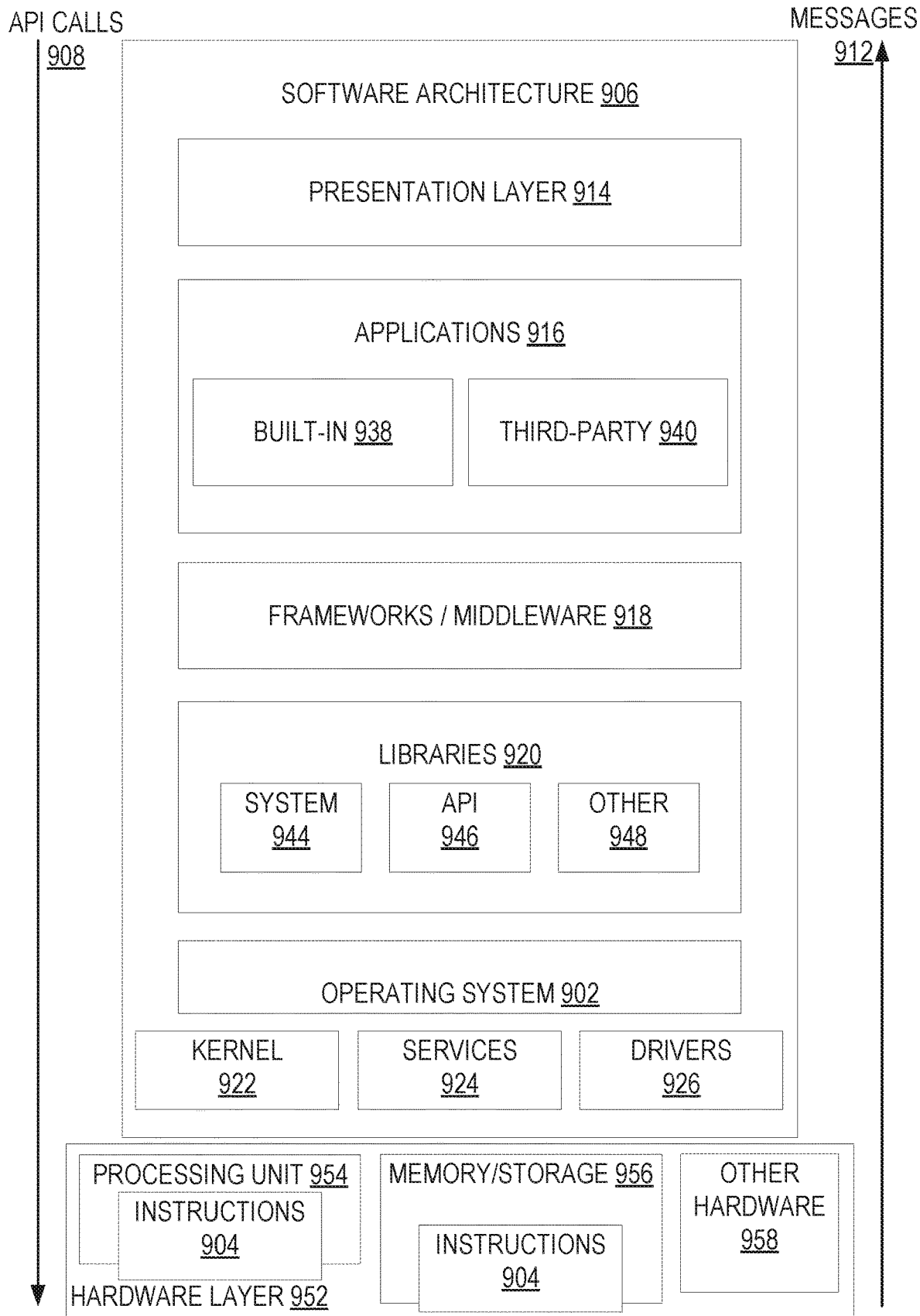
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
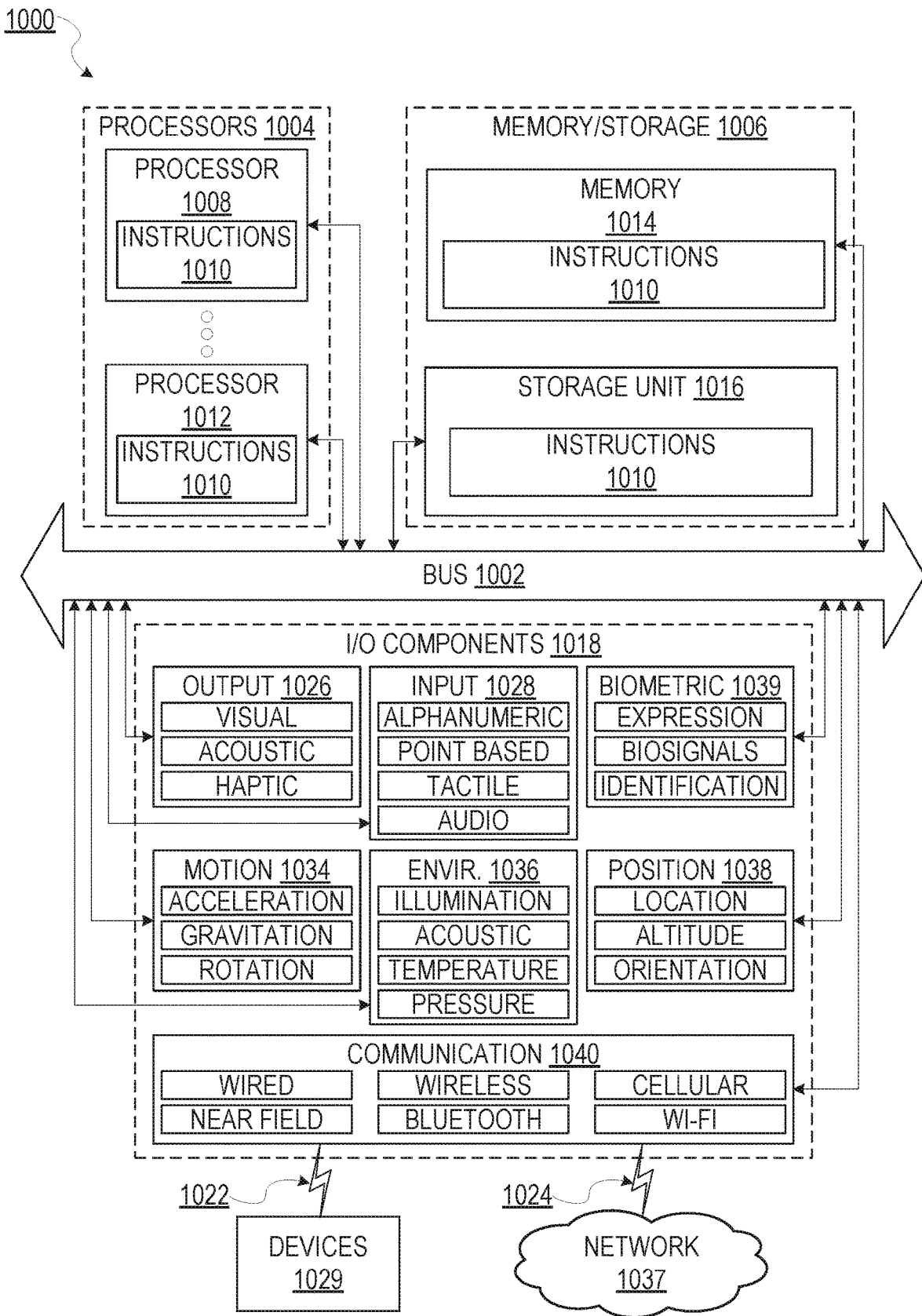
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but also deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, by a messaging application, an image captured by a front-facing camera of a first computing device;
displaying, by the messaging application, the image on a display screen of the first computing device;
receiving a request to send the image to a second computing device;
in response to receiving the request to send the image from the first computing device to the second computing device, based on determining that one or more graphical elements were added to the image after the image was captured, automatically generating a mirrored version of the image captured by the front-facing camera; and
sending the mirrored version of the image to the second computing device.

2. The method of claim 1, wherein the front-facing camera is included on a same side of the first computing device as the display screen of the first computing device, and wherein the front-facing camera programmatically displays, on the display screen, a given mirrored version of the image captured by the front-facing camera, and wherein generating the mirrored version of the image that was captured by the front-facing camera comprises generating a non-mirrored version of the image by mirroring back the given mirrored version.

3. The method of claim 1, further comprising:
in response to receiving the request to send the image to a second computing device, determining that the image was captured by the front-facing camera and depicts content in mirrored form; and
generating the mirrored version in response to determining that the image was captured by the front-facing camera, the mirrored version depicts content of the image in non-mirrored form.

4. The method of claim 1, further comprising:
displaying a plurality of image modification options on the display screen together with the image captured by the front-facing camera, the plurality of image modification options comprising a mirror option that corresponds to a flip function;
receiving a selection of the mirror option; and
displaying the mirrored version of the image on the display screen in response to receiving the user selection of the mirror option.

5. The method of claim 4, wherein the image displayed on the screen comprises text in an incorrect orientation, and wherein the mirrored version of the image comprises the text correctly oriented.

6. The method of claim 4, further comprising:
receiving input that augments the displayed mirrored version of the image with the one or more graphical elements; and
sending, to the second computing device, the mirrored version of the image that has been augmented with the one or more graphical elements.

7. The method of claim 1, further comprising:
receiving input that augments the displayed image with the one or more graphical elements; and
sending, to the second computing device, the image augmented with the one or more graphical elements instead of the mirrored version of the image in response to determining that the image has been augmented with the one or more graphical elements.

8. The method of claim 1, further comprising:
receiving input that augments the displayed image with the one or more graphical elements;
determining whether the one or more graphical elements includes textual content; and
sending the image augmented with the one or more graphical elements instead of the mirrored version of the image in response to determining that the one or more graphical elements includes textual content.

9. The method of claim 8, wherein generating the mirrored version comprises:
generating a mirrored version of the image with the one or more graphical elements in response to determining that the one or more graphical elements do not include textual content; and
sending the mirrored version of the image with the one or more graphical elements to the second computing device.

10. The method of claim 9, wherein the one or more graphical elements that do not include textual content comprise at least one of a necklace, an avatar, a virtual object, a ring, jewelry, a hat without text, or an emoji.

11. The method of claim 1, further comprising:
receiving input that augments the displayed image with the one or more graphical elements;
retrieving metadata associated with the one or more graphical elements that indicates whether mirroring the one or more graphical elements is allowed;
sending, to the second computing device, the image augmented with the one or more graphical elements instead of the mirrored version of the image in response to determining that the metadata indicates that mirroring the one or more graphical elements is not allowed; and
sending, to the second computing device, a mirrored version of the image augmented with the one or more graphical elements in response to determining that the metadata indicates that mirroring the one or more graphical elements is allowed.

12. The method of claim 1, further comprising:
capturing, by the messaging application, a first portion of a video using a rear-facing camera of the first computing device;
capturing, by the messaging application, a second portion of the video using the front-facing camera of the first computing device; and
modifying the video by replacing the second portion of the video but not the first portion of the video with a mirrored version of the second portion of the video.

13. The method of claim 12, wherein the modifying is performed in response to receiving a request to share the video with another user.

14. The method of claim 1, wherein the mirrored version of the image is presented on the display screen for confirmation before being sent to the second computing device.

15. The method of claim 1, wherein the mirrored version of the image is not presented on the display screen before being sent to the second computing device.

16. A system comprising:
a processor configured to perform operations comprising:
receiving, by a messaging application, an image captured by a front-facing camera of a first computing device;
displaying, by the messaging application, the image on a display screen of the first computing device;
receiving a request to send the image to a second computing device;
in response to receiving the request to send the image from the first computing device to the second computing device, based on determining that one or more graphical elements were added to the image after the image was captured, automatically generating a mirrored version of the image captured by the front-facing camera; and
sending the mirrored version of the image to the second computing device.

17. The system of claim 16, wherein the front-facing camera is included on a same side of the first computing device as the display screen of the first computing device, and wherein the front-facing camera programmatically displays, on the display screen, a given mirrored version of the image captured by the front-facing camera, and wherein generating the mirrored version of the image that was captured by the front-facing camera comprises generating a non-mirrored version of the image by mirroring back the given mirrored version.

18. The system of claim 16, wherein the operations further comprise:
in response to receiving the request, determining that the image was captured by the front-facing camera and depicts content in mirrored form; and
generating the mirrored version in response to determining that the image was captured by the front-facing camera, the mirrored version depicts content of the image in non-mirrored form.

19. A non-transitory machine-readable storage medium that includes instructions that, when executed by one or more processors of a machine, cause the machine to perform operations comprising:
receiving, by a messaging application, an image captured by a front-facing camera of a first computing device;
displaying, by the messaging application, the image on a display screen of the first computing device;
receiving a request to send the image to a second computing device;
in response to receiving the request to send the image from the first computing device to the second computing device, based on determining that one or more graphical elements were added to the image after the image was captured, automatically generating a mirrored version of the image captured by the front-facing camera; and
sending the mirrored version of the image to the second computing device.

20. The non-transitory machine-readable storage medium of claim 19, wherein the operations further comprise:
receiving input that augments the displayed image with the one or more graphical elements; and
sending, to the second computing device, the image augmented with the one or more graphical elements instead of the mirrored version of the image in response to determining that the image has been augmented with the one or more graphical elements.

* * * * *

UNITED STATES PATENT AND TRADEMARK OFFICE
CERTIFICATE OF CORRECTION

PATENT NO. : 11,158,028 B1
APPLICATION NO. : 16/665811
DATED : October 26, 2021
INVENTOR(S) : Guy Melamed Page 1 of 1

It is certified that error appears in the above-identified patent and that said Letters Patent is hereby corrected as shown below:

In the Claims

In Column 24, Line 29, in Claim 4, after "the", delete "user"

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*